US010511513B2

(12) United States Patent
Padmanabhan et al.

(10) Patent No.: US 10,511,513 B2
(45) Date of Patent: Dec. 17, 2019

(54) PING PAIR TECHNIQUE FOR DETECTING WIRELESS CONGESTION

(71) Applicant: Microsoft Technology Licensing, LLC, Redmond, WA (US)

(72) Inventors: Venkata N. Padmanabhan, Bengaluru (IN); Nimantha Thushan Baranasuriya, Singapore (SG)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 15/354,344

(22) Filed: Nov. 17, 2016

(65) Prior Publication Data

US 2018/0091411 A1 Mar. 29, 2018

(51) Int. Cl.

*H04L 12/26* (2006.01)
*H04L 12/851* (2013.01)
*H04L 12/801* (2013.01)
*H04L 12/841* (2013.01)

(52) U.S. Cl.

CPC .......... *H04L 43/10* (2013.01); *H04L 43/0864* (2013.01); *H04L 47/11* (2013.01); *H04L 47/2408* (2013.01); *H04L 47/283* (2013.01)

(58) Field of Classification Search

None

See application file for complete search history.

(56) References Cited

U.S. PATENT DOCUMENTS 5,121,383 A * 6/1992 Golestani ................ H04J 3/247 370/235
6,711,137 B1 * 3/2004 Klassen ................ H04L 41/142 370/252
6,885,641 B1 * 4/2005 Chan ..................... H04L 41/142 370/252
7,633,869 B1 12/2009 Morris et al.
7,720,065 B2 5/2010 Liu et al.
7,787,404 B2 8/2010 Zhang et al.
7,945,656 B1 5/2011 Remaker
8,149,694 B2 4/2012 Sapek
8,264,988 B2 9/2012 Zhang et al.
8,279,759 B1 10/2012 Jones
8,923,270 B2 12/2014 Lee et al.
8,989,760 B2 3/2015 Tokgoz et al.

(Continued)

FOREIGN PATENT DOCUMENTS

CN 103108342 A 5/2013

OTHER PUBLICATIONS

Li et al., "Measuring Queue Capacities of IEEE 802.11 Wireless Access Points", In Proceedings of Fourth International Conference on Broadband Communications, Networks and Systems, Sep. 2007, 8 pgs.

(Continued)

*Primary Examiner* — Phirin Sam
*Assistant Examiner* — Faiyazkhan Ghafoerkhan

(57) ABSTRACT

A process of determining queueing delay. The process sends a high priority ping request to an access point; sends a low priority ping request to the access point; receives a high priority ping response from the access point; receives a low priority ping response from the access point; and calculates the queuing delay based on the difference in the round trip times of the low priority ping request from the high priority ping request.

20 Claims, 8 Drawing Sheets

110 Send High Priority Ping Request to Access Point
120 Send Low Priority Ping Request to Access Point
130 Receive High Priority Ping Response from Access Point
140 Receive Low Priority Ping Response from Access Point
150 Calculate Queuing Delay based on Difference between High and Low Priority Ping Responses

(56) References Cited

U.S. PATENT DOCUMENTS

2005/0111487 A1* 5/2005 Matta .................. H04L 41/0896 370/468
2007/0041364 A1* 2/2007 Kakadia .................. H04L 45/00 370/352
2007/0097865 A1* 5/2007 Song ....................... H04J 3/247 370/235
2007/0189184 A1* 8/2007 Ryu ...................... H04J 3/0682 370/252
2007/0217448 A1* 9/2007 Luo ......................... H04L 47/10 370/468
2008/0259813 A1* 10/2008 Matta .................. H04L 41/0896 370/252
2009/0164657 A1* 6/2009 Li ....................... H04L 41/0896 709/233
2009/0247087 A1* 10/2009 Chin ................... H04W 56/009 455/67.14
2010/0284276 A1* 11/2010 Cohen ................... H04L 67/104 370/231
2010/0287263 A1* 11/2010 Liu ....................... G06F 9/5088 709/224
2011/0170414 A1* 7/2011 Lee ..................... H04L 41/5022 370/236
2013/0100816 A1* 4/2013 Bergamasco ....... H04L 43/0864 370/237
2013/0136002 A1* 5/2013 Song ....................... H04L 47/25 370/235
2013/0258947 A1* 10/2013 Gomez Diaz ......... H04W 8/005 370/328
2014/0056234 A1* 2/2014 Hedlund ............... H04W 24/02 370/329
2014/0286295 A1* 9/2014 Liu ....................... H04W 72/10 370/329
2014/0359767 A1* 12/2014 Liu ....................... G06F 9/5088 726/23
2015/0163114 A1* 6/2015 Hsiao .................. H04L 43/0864 370/252
2015/0195746 A1 7/2015 Franklin et al.
2015/0257024 A1* 9/2015 Baid ..................... H04W 24/10 370/338
2016/0014007 A1 1/2016 Karame
2016/0037559 A1 2/2016 Malik et al.
2016/0065435 A1* 3/2016 Ito ....................... H04L 43/0864 375/358
2016/0182387 A1* 6/2016 Briscoe ................... H04L 47/26 370/235
2017/0006494 A1* 1/2017 Wang .................... H04W 8/005
2017/0230230 A1* 8/2017 Theogaraj ............... H04L 45/00
2017/0303159 A1* 10/2017 Ma ........................ H04L 1/0001
2018/0093159 A1* 4/2018 DeAngelis ......... A63B 71/0619

OTHER PUBLICATIONS

Davies, Joseph, "The Cable GuyQoS Support in Windows", https://technet.microsoft.com/en-gb/magazine/746905c4-c404-4d89-a866-405d4b0ba5cc, Retrieved Date: Sep. 21, 2016, 2 pgs.

Shalunov et al., "Low Extra Delay Background Transport (LEDBAT)", https://tools.ietf.org/html/rfc6817, Dec. 2012, pp. 1-25.

* cited by examiner

PING PAIR TECHNIQUE FOR DETECTING WIRELESS CONGESTION

RELATED APPLICATION

This application claims priority to Indian Application No. 201641033377 filed Sep. 29, 2016, which is incorporated herein by reference.

BACKGROUND

As the usage of wireless networks, particularly wireless or WiFi networks, explodes, application performance is often dependent on the health of the WiFi network. In particular, when a WiFi network is congested, queues could build up at the WiFi network access point, leading to increased delay or packet loss. In turn, transport-layer protocols, such as TCP, and applications, such as telephony applications, interpret such increased delay or packet loss as a sign of congestion, and they back off their transmissions by slowing their sending rate. Real-time streaming applications, such as a telephony application, are very sensitive to delay, so they will back off sharply in the hope that doing so will help reduce the delay.

These transport-layer protocols and application-layers treat the network as a black box, without regard to whether the congestion is self-induced or because of other traffic. In the latter case, backing off is only likely to hurt the performance of a flow without any corresponding benefit in terms of reduced delay or packet loss.

SUMMARY

Non-limiting examples of the present disclosure describe a process of determining queuing delay. The process sends a high priority ping request to an access point; sends a low priority ping request to the access point; receives a high priority ping response from the access point; receives a low priority ping response from the access point; and calculates the queuing delay based on the difference in either the round trip times of the low priority ping request from the high priority ping request or the difference in the arrival times of the low priority ping request from the high priority ping request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
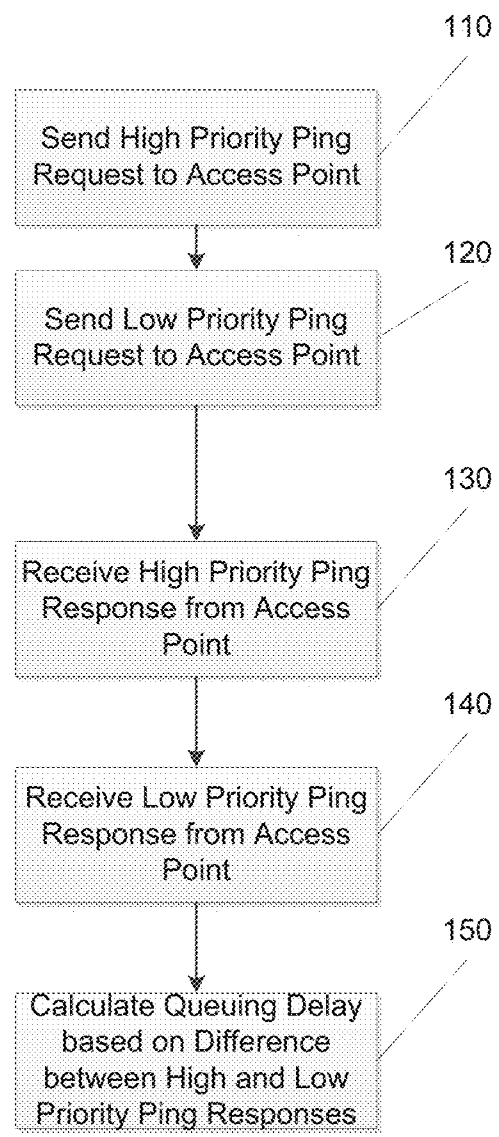
FIG. 1 is a flow chart of a method for determining the queuing delay of an access point in which aspects of the present disclosure may be practiced.

Examples disclosed herein describe systems and methods for detecting wireless congestion at an access point and determining a target flow's contribution to any congestion. To accomplish this a pair of back-to-back Internet Control Message Protocol ("ICMP") Echo Requests, more commonly known as "ping requests," with certain TOS bit settings are sent to an access point. A pair of ICMP Echo Responses, commonly known as "ping responses," are returned. A ping request with a high priority TOS will receive a ping response with the same high priority TOS; similarly, a ping request with a low priority TOS will receive a ping response with the same low priority TOS. Likewise, a ping response will return the same payload, thus the same size payload, as the ping request. So, for example, a large high priority ping request will return a large high priority ping response, whereas a small, intermediate priority ping request will return a small, intermediate priority ping response.

As the high priority TOS will be placed at the head of the queue, and low priority TOS will be placed at the back of the queue, the difference in response times in the respective ping responses is a measure of the queue delay. Please note that this disclosure discusses the use of a single queue, but access points typically use multiple queues, with each queue being used for a particular priority and the queues being served in priority order. Discussion within this disclosure of a single queue is for purposes of simplifying the explanation, and those skilled in the art after reading this disclosure would understand this disclosure to apply to the multiple queue system described in the previous sentence. This method works well because TOS bits for Internet traffic are rarely, if ever, set to anything other than the default, which is normal priority. However, most access points recognize TOS bits as indicating priority and act accordingly. TOS bits, again, are rarely set, and, even if set, they are likely to get reset as packets flow across administrative boundaries on the Internet.

In addition to the "ping pair" method described above, further examples disclosed herein describe systems and methods for determining how much of a queue delay is due to a target flow's contribution to the queue. This may be accomplished by counting the number of target flow packets sandwiched between ping responses of a ping pair as described above. The sum of the transmission time of each packet plus the channel access delay incurred by the packet provides a target flow's contribution to the queuing delay.

Further examples disclosed herein describe systems and methods for determining whether an access point supports TOS-based prioritization. This may be accomplished by sending one or more large, high-priority ping requests, a small, normal-priority ping request, and a small, intermediate priority ping request and examining the order of the ping responses to see if the access point supports TOS through reordering the ping requests. If the ping responses to the normal-priority ping request and the intermediate priority ping request are reversed, that would indicate that the access point supports TOS-based prioritization.

The above methods, when bundled together, form a queue analysis method and system.

FIG. 1 is a flow chart of a method for determining the queuing delay of an access point in which aspects of the present disclosure may be practiced. A high priority ping request is sent to the access point (stage 110). Next, a normal priority ping request is sent to the access point (stage 120). Normal priority ping requests are typically sent with a priority of 0000. The priority of these ping requests is set by the TOS bits in the requests. High priority ping requests are typically sent with a priority of 0xC0. The access point, if it supports TOS, will place the high priority ping request at the head of the queue and the normal priority request in the back of the queue. A high priority ping response is received from the access point (stage 130). Then, a normal priority ping response is received from the access point (stage 140). The ping responses include a round trip time ("RTT"). The method may subtract the RTT of the high priority ping response from the RTT of the low priority ping response to determine the queuing delay or may compute the difference in arrival time between the high priority ping response and the low priority ping response (stage 150).

Figure 2A:
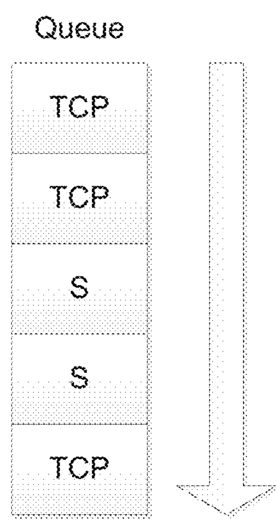
FIGS. 2A-2B are illustrations of the queue of an access point at various points when using the method for determining the queueing delay of an access point in which aspects of the present disclosure may be practiced.
Figure 2B:
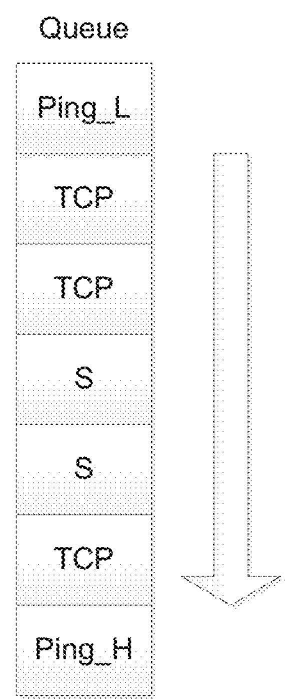

FIGS. 2A-2B are illustrations of the queue of an access point at various points when using the method for determining the queueing delay of an access point in which aspects of the present disclosure may be practiced. FIG. 2A illustrates an exemplary access point queue prior to the start of the queueing delay method described above FIG. 2B illustrates the exemplary access point queue after the normal priority ping request is received by the access point. One can see that the normal priority ping request is placed at the back of the queue. While the above figures have been described with respect to a single queue, access points may implement multiple queues and the above methodology works in a multiple queue system as well as the generalized single queue system described.

Figure 3:
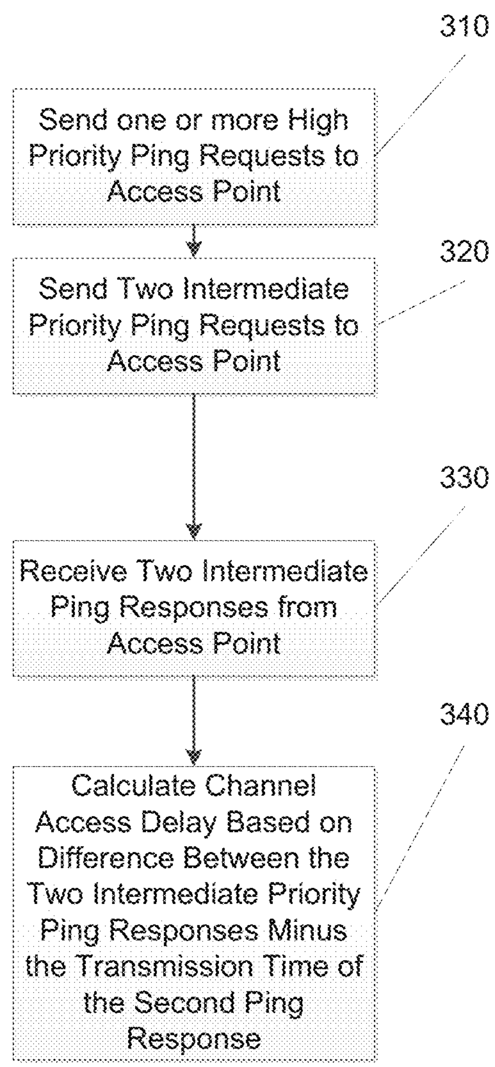
FIG. 3 is a flow chart of a method for determining channel access delay of an access point in which aspects of the present disclosure may be practiced.

FIG. 3 is a flow chart of a method for determining channel access delay of an access point in which aspects of the present disclosure may be practiced. Channel access delay will be needed in calculating a target flow's contribution to any queuing delay, as described in the next paragraph. Initially, one or more large, high priority ping requests may be sent to the access point (stage 310). Next, two small, intermediate priority ping requests are sent to the access point (stage 320). Intermediate priority ping requests are typically sent with a priority of 0xA0. These multiple ping requests may be sent back-to-back. Two intermediate priority ping responses are received from the access point (stage 330). The channel access delay is calculated as the difference between receipts of the two intermediate priority ping responses less the transmission time of the second ping response (stage 340). The transmission time of the second ping response can be determined by dividing the packet size of the second ping response by the MAC layer data rate at which the packet was transmitted over the channel.

Figure 4:
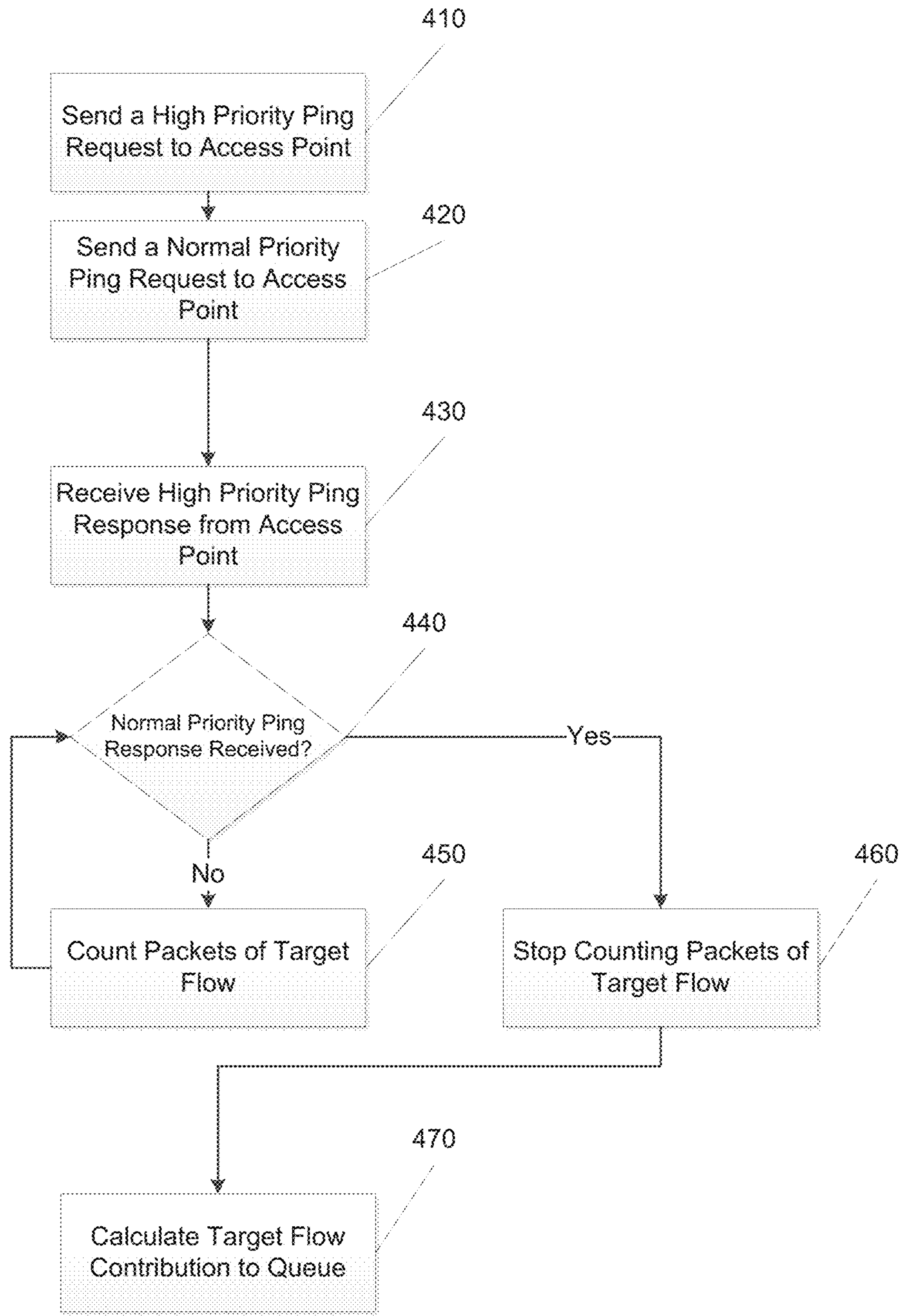
FIG. 4 is a flow chart of a method for determining target flow contribution to a queuing delay of an access point in which aspects of the present disclosure may be practiced.

FIG. 4 is a flow chart of a method for determining target flow contribution to a queuing delay of an access point in which aspects of the present disclosure may be practiced. A target flow may be an application, for example, a telephony application. A high priority ping request is sent to the access point (stage 410). A normal priority ping request is sent to the access point (stage 420). After a high priority ping response is received from the access point (stage 430), the method counts the number of packets of a target flow of interest until such time as a normal priority ping response is received (stages 440, 450, and 460). More particularly, the method checks to determine if a normal priority ping request has been received (stage 440). If not, packets of the target flow are counted (stage 450). If the normal priority ping response has been received, counting of target flow packets is stopped (stage 460). To calculate the target flow contribution to the queue, the transmission time of each packet of the target flow (calculated as described in the previous paragraph) is added to the channel access delay incurred by each packet (stage 470). This is the amount of delay in the queue attributed to the target flow. If this delay is divided by the total queue delay and multiplied by 100%, the percentage of the queue delay attributed to the target flow may be calculated.

Figure 5:
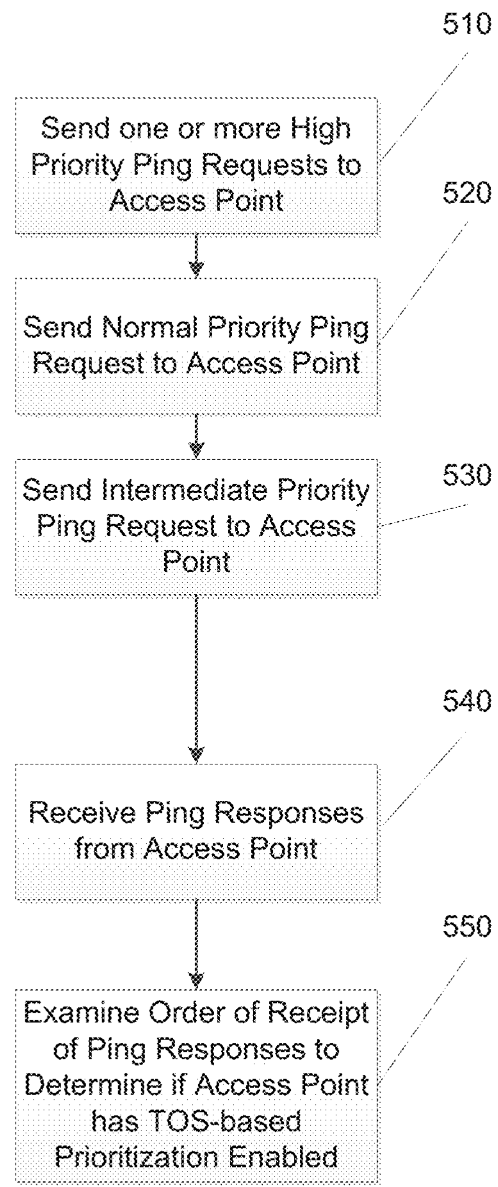
FIG. 5 is a flow chart of a method for determining if an access point has Type of Service ("TOS")-based prioritization enabled in which aspects of the present disclosure may be practiced.

FIG. 5 is a flow chart of a method for determining if an access point has TOS-based prioritization enabled in which aspects of the present disclosure may be practiced. This method examines whether the access point reorders, or fails to reorder, ping requests sent to the access point. A one or more large, high priority ping requests are sent to the access point (stage 510). A small, normal priority ping request is next sent to the access point (stage 520); followed by a small, intermediate priority ping request being sent to the access point (stage 530). All ping requests may be sent back-to-back. Multiple ping responses are then received from the access point (stage 540). If the ping responses remain in the high/low/intermediate order in which they were sent, then the access point does not support TOS-based prioritization; if the ping responses are in high/intermediate/low order then the access point is supporting TOS-based prioritization.

Figure 6:
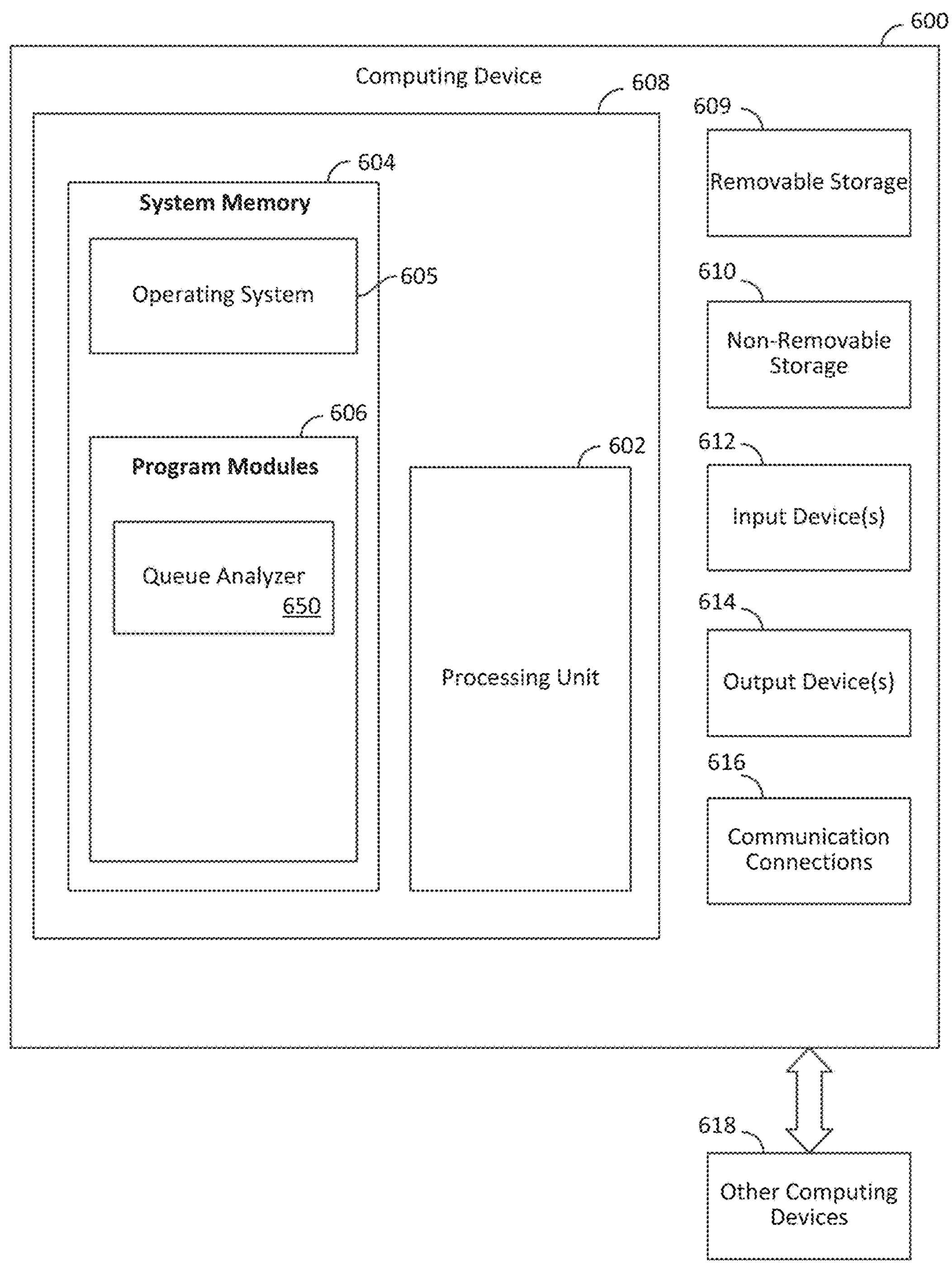
FIG. 6 is a block diagram illustrating example physical components of a computing device with which aspects of the disclosure may be practiced.

FIGS. 6-7 and the associated descriptions provide a discussion of a variety of operating environments in which aspects of the disclosure may be practiced. However, the devices and systems illustrated and discussed with respect to FIGS. 6-7 are for purposes of example and illustration and are not limiting of a vast number of computing device configurations that may be utilized for practicing aspects of the disclosure, as described herein.

FIG. 6 is a block diagram illustrating physical components (e.g., hardware) of a computing device 600 with which aspects of the disclosure may be practiced. The computing device components described below may have computer executable instructions for implementing a queue analysis application 650 on a computing device, including computer executable instructions that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running queue analysis application 650.

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., life cycle management application 650) may perform processes including, but not limited to, the aspects, as described herein. Other program modules that may be used in accordance with aspects of the present disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
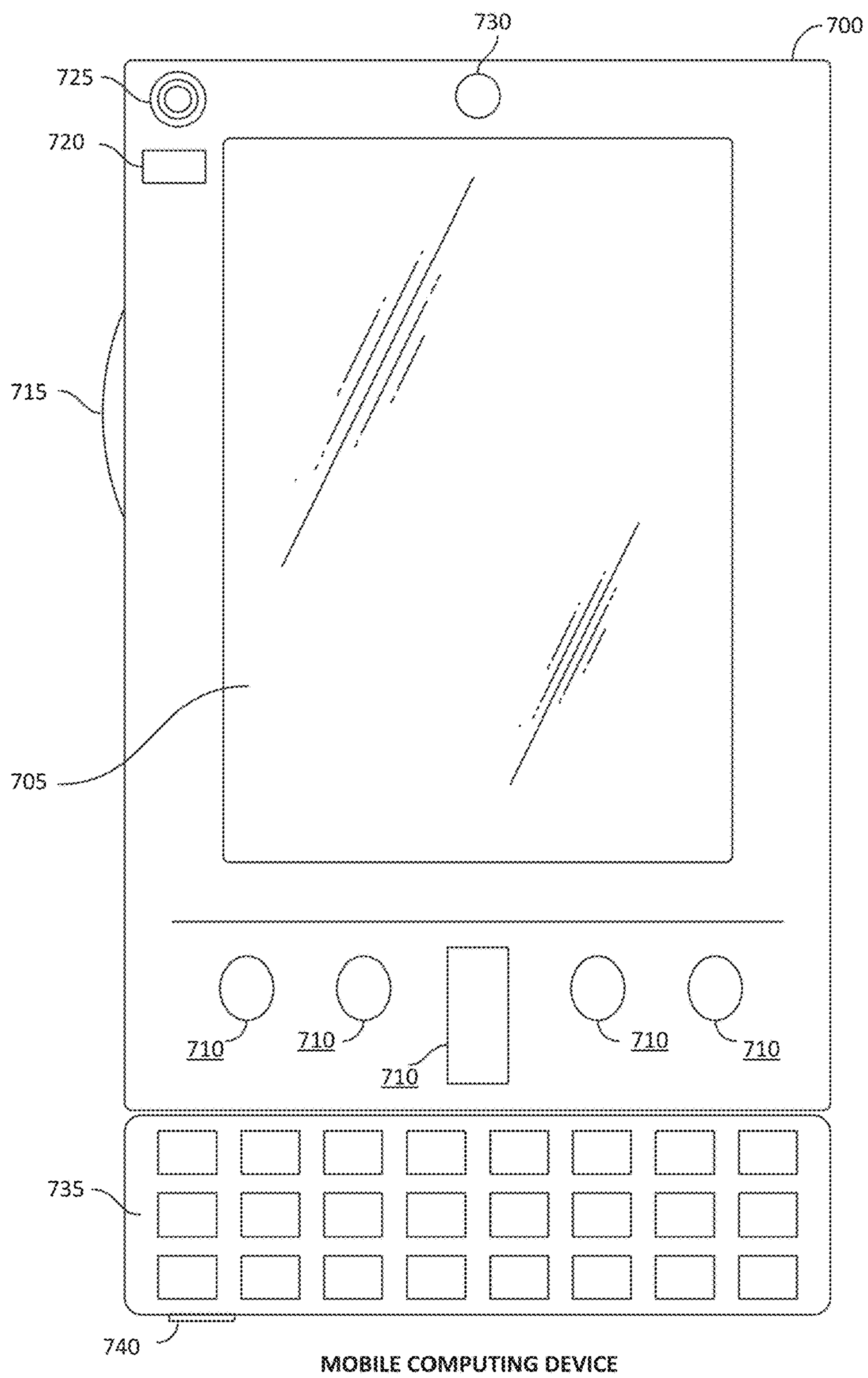
FIGS. 7A and 7B are simplified block diagrams of a mobile computing device with which aspects of the present disclosure may be practiced.
Figure 7B:
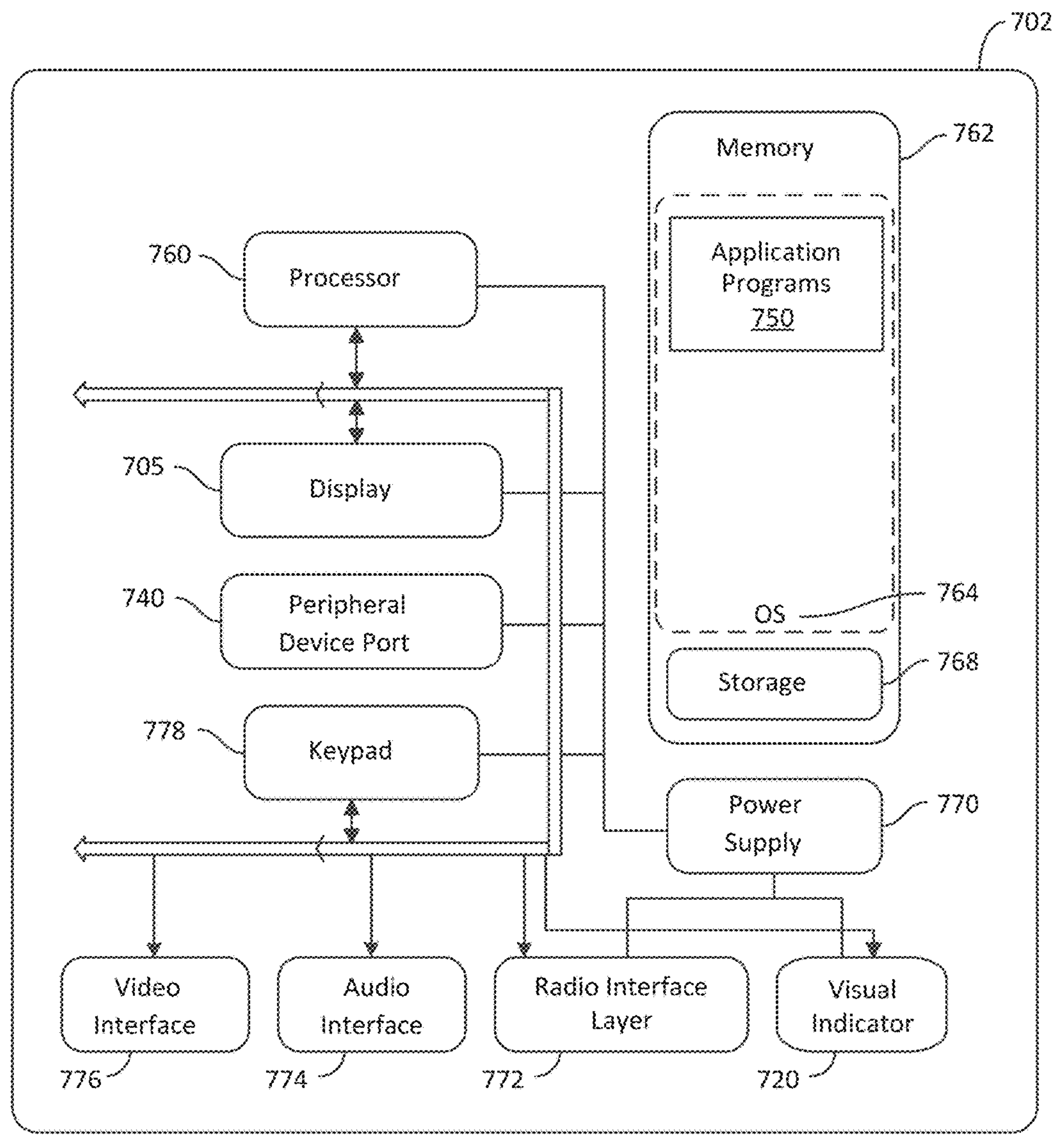

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 800 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 868 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for providing a queue analysis application.

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 866 via the operating system 764, and vice versa.

The visual indicator 720 may be used to provide visual notifications, and/or an audio interface 774 may be used for producing audible notifications via an audio transducer 725 (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 770 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 876 that enables an operation of peripheral device 730 (e.g., on-board camera) to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 7A and 7B are described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:

sending a high priority ping request to an access point, wherein the high priority ping is placed at a front of a queue at the access point;

sending a lower priority ping request to the access point, wherein the low priority ping is placed at a back of the queue at the access point;

receiving a high priority ping response from the access point;

receiving a lower priority ping response from the access point;

calculating a queuing delay of the access point based on a difference in a round trip time of the lower priority ping request and the lower priority ping response and a round trip time of the high priority ping request and the high priority ping response; and providing the queuing delay to an application.

2. The method of claim 1, wherein:

a payload of the high priority ping response matches a payload of the high priority ping request;

a payload of the lower priority ping response matches a payload of the lower priority ping request; and calculating the queuing delay comprises computing a difference in arrival times between the high priority ping response and the lower priority ping response.

3. The method of claim 1, further comprising calculating a target flow's contribution to the queuing delay.

4. The method of claim 3, wherein calculating the target flow's contribution to the queuing delay comprises:

sending a second high priority ping request to the access point;

send a normal priority ping request to the access point;

receiving a second high priority ping response from the access point;

counting a number of sandwiched packets of the target flow until a normal priority ping response is received; and adding a transmission time of each sandwiched packet of the target flow to a channel access delay incurred by each packet to calculate the target flow's contribution to the queuing delay.

5. The method of claim 3, further comprising dividing the contribution to the queuing delay by a total queue delay and multiplying by 100% to determine a percentage of the queuing delay attributable to the target flow.

6. The method of claim 4, wherein the transmission time of each sandwiched packet of the target flow is determined by dividing a packet size of each sandwiched packet by a MAC layer data rate at which each sandwiched packet is transmitted.

7. The method of claim 4, wherein the channel access delay is determined by:

sending a large, high priority ping request to the access point;

sending first and second small, intermediate priority ping requests to the access point;

receiving first and second intermediate priority ping responses from the access point; and determining the channel access delay by determining a difference between receipt of the first and the second intermediate priority ping responses and a transmission time of the second intermediate priority ping response.

8. The method of claim 1, further comprising determining if the access point has TOS-based prioritization enabled.

9. A system comprising:

at least one processor; and a memory operatively connected with the at least one processor storing computer-executable instructions that, when executed by the at least one processor, cause the at least one processor to execute a method that comprises:

sending a high priority ping request to an access point, wherein the high priority ping is placed at a front of a queue at the access point;

sending a lower priority ping request to the access point, wherein the low priority ping is placed at a back of the queue at the access point and the high priority ping request and the low priority ping request are sent consecutively;

receiving a high priority ping response from the access point;

receiving a lower priority ping response from the access point;

calculating a queuing delay of the access point based on a difference in arrival times between the high priority ping response and the lower priority ping response; and providing the queuing delay to an application.

10. The method of claim 9, wherein calculating the queuing delay comprises computing a difference in a round trip time of the lower priority ping request and the lower priority ping response from a round trip time of the high priority ping request and the high priority ping response.

11. The method of claim 9, further comprising calculating a target flow's contribution to the queuing delay.

12. The method of claim 11, wherein calculating the target flow's contribution to the queuing delay comprises:

sending a second high priority ping request to the access point;

sending a normal priority ping request to the access point;

receiving a second high priority ping response from the access point;

counting a number of sandwiched packets of the target flow until a normal priority ping response is received; and adding a transmission time of each sandwiched packet of the target flow to a channel access delay incurred by each sandwiched packet to calculate the target flow's contribution to the queuing delay.

13. The method of claim 11, further comprising dividing the target flow's contribution to the queuing delay by a total queue delay and multiplying by 100% to determine a percentage of the queuing delay attributed to the target flow.

14. The method of claim 12, wherein the transmission time of each sandwiched packet of the target flow is determined by dividing a packet size of each sandwiched packet by a MAC layer data rate at which each sandwiched packet is transmitted.

15. The method of claim 12, wherein the channel access delay is determined by:

sending a large, high priority ping request to the access point;

sending first and second small, intermediate priority ping requests to the access point;

receiving first and second intermediate priority ping responses from the access point; and determining the channel access delay by determining a difference between receipt of the first and the second intermediate priority ping responses and a transmission time of the second intermediate priority ping response.

16. The method of claim 9, further comprising determining if the access point has TOS-based prioritization enabled.

17. A method, comprising:

sending a high priority ping request to an access point;

send a normal priority ping request to the access point;

receiving a high priority ping response from the access point;

counting a number of sandwiched packets of a target flow until a normal priority ping response is received;

adding a transmission time of each sandwiched packet of the target flow to a channel access delay incurred by each sandwiched packet to calculate a contribution of the target flow to a queuing delay; and providing the contribution of the target flow and the queuing delay to a real-time streaming application.

18. The method of claim 17, further comprising dividing the contribution of the target flow to the queuing delay by a total queue delay and multiplying by 100% to determine a percentage of the queuing delay attributed to the target flow.

19. The method of claim 17, wherein the transmission time of each sandwiched packet of the target flow is determined by dividing a packet size of each sandwiched packet by a MAC layer data rate at which each sandwiched packet is transmitted.

20. The method of claim 17, wherein the channel access delay is determined by:

sending a large, high priority ping request to the access point;

sending first and second small, intermediate priority ping requests to the access point;

receiving first and second intermediate priority ping responses from the access point; and determining the channel access delay by determining a difference between receipt of the first and the second intermediate priority ping responses and a transmission time of the second intermediate priority ping response.

* * * * *